June 13, 1933. C. M. HAYNES 1,913,837
BEAN SNIPPING MACHINE
Filed Jan. 13, 1932  2 Sheets-Sheet 1
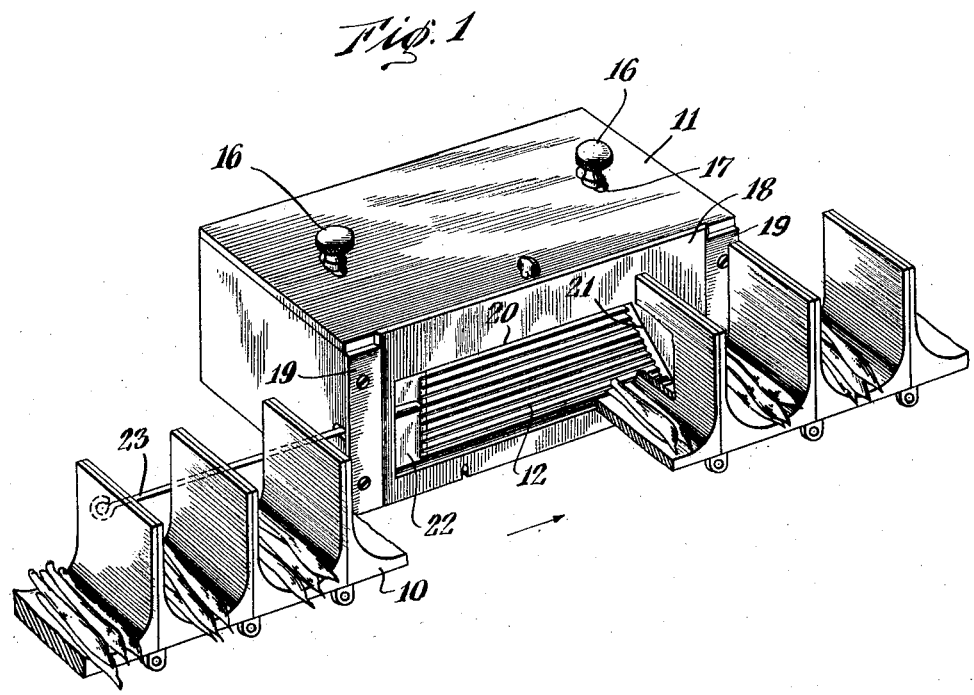
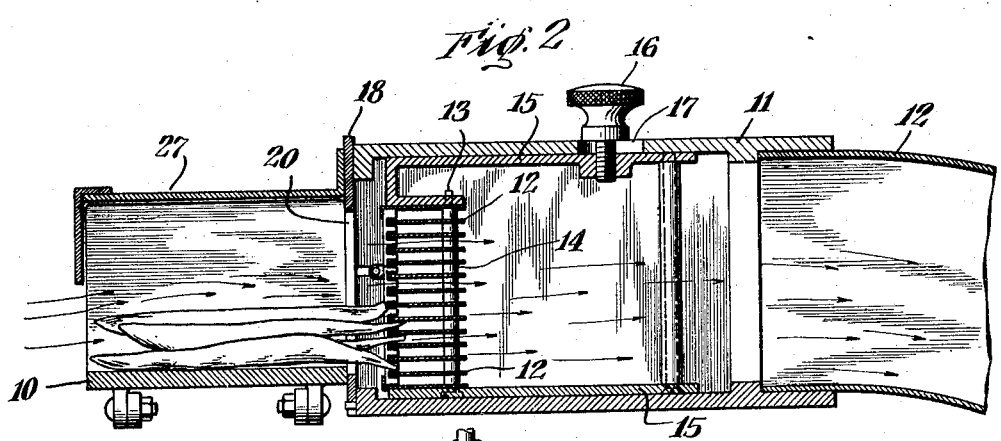
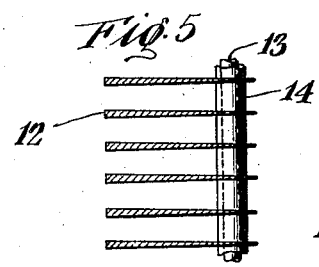
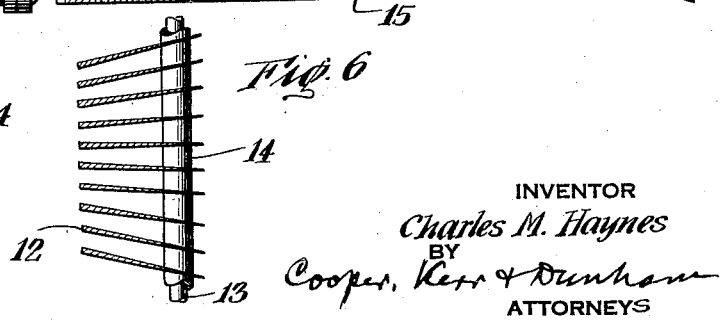
INVENTOR
Charles M. Haynes
BY
Cooper, Kerr & Dunham
ATTORNEYS June 13, 1933   C. M. HAYNES   1,913,837
BEAN SNIPPING MACHINE
Filed Jan. 13, 1932   2 Sheets-Sheet 2
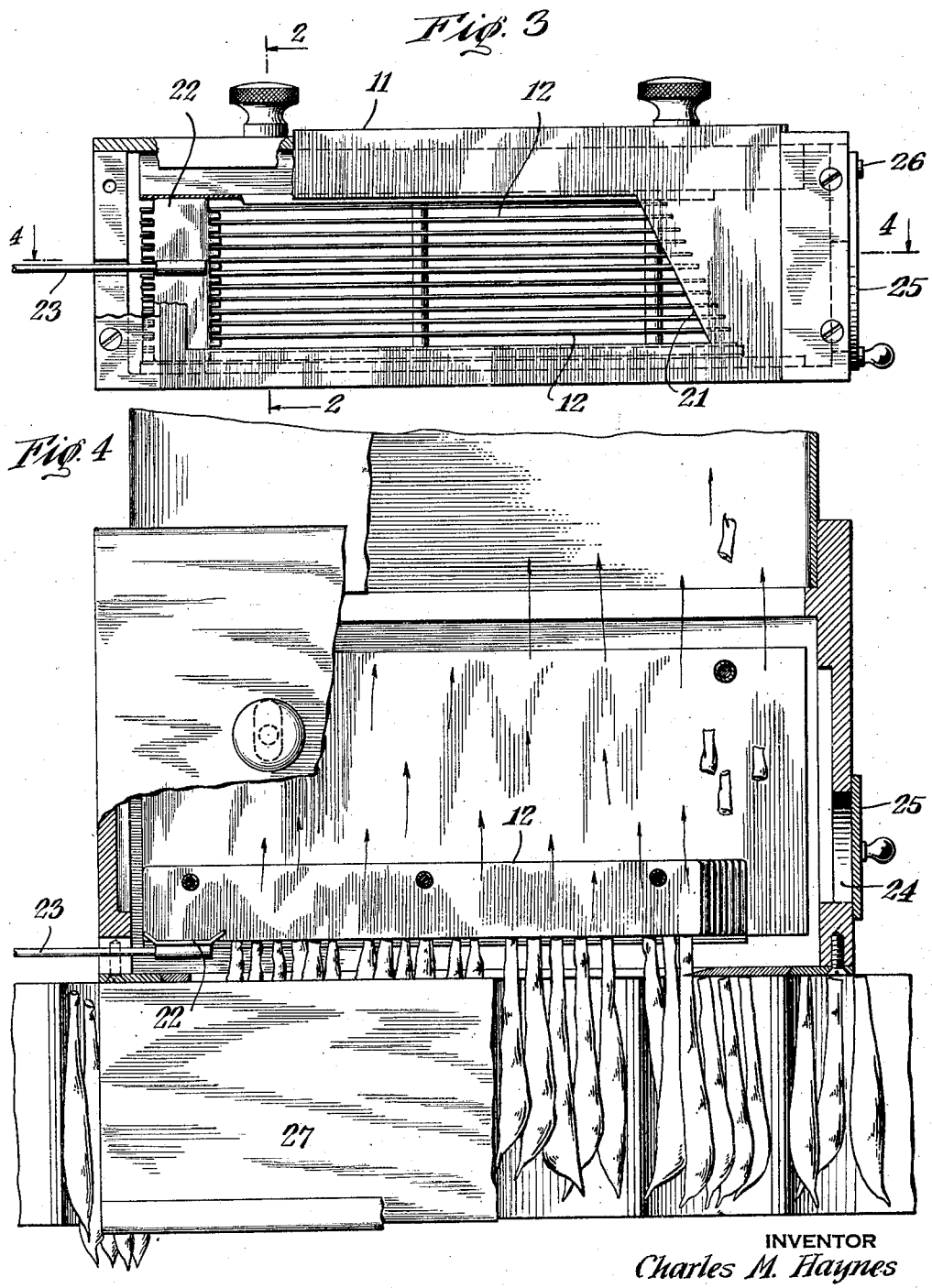
INVENTOR
Charles M. Haynes
BY
Cooper, Kerr & Dunham
ATTORNEYS Patented June 13, 1933

1,913,837

UNITED STATES PATENT OFFICE

CHARLES M. HAYNES, OF CHILLICOTHE, OHIO

BEAN-SNIPPING MACHINE

Application filed January 13, 1932. Serial No. 586,285.

This invention relates to machines for snipping or cutting off the ends of string beans preparatory to cooking, and relates more particularly to machines in which the beans are carried on a conveyor (which may be of the flexible type running over sprockets, rollers, or the like, or of the rigid type on a wheel or drum) past a cutter which cuts off the laterally protruding ends of the beans. The latter may be caused to protrude from the open side of the conveyor in various ways, as for example by tilting the conveyor so that the beans are moved outwardly by gravity, or by means of suction exerted at a suitable point in the travel of the conveyor.

In carrying out the invention in the preferred manner suction is employed to shift the beans transversely of the conveyor into position to cooperate with the cutting or snipping means, the suction being applied through what is known as a suction box arranged alongside of the conveyor so that as the beans are carried past the box the strong current of air entering the latter will draw the beans partly out of the laterally open conveyor buckets or receptacles. The present invention is directed to the improvement of the means which limits the protrusion of the beans into the box and beyond the cutting edge of the cutter, and one of its objects is to provide means for the purpose which will not require the beans to be graded or sorted as to size or length. Another object is to provide means which will minimize the possibility of the more or less tapering ends of the beans becoming caught or held before or after snipping, with consequent clogging or choking of the limiting means. To these and other ends the invention comprises the provision of a plurality of elongated slots arranged one above the other in the suction box and in parallelism with the travel of the conveyor, with the cutter at the end of the slots so as to be engaged by the beans after they have been drawn into the box. The slots are preferably formed by a series of superposed thin metal plates extending across the front of the suction box and reaching to or slightly beyond the cutter, which latter may take the form of an inclined knife by which the protruding ends of the beans are sheared off as the beans are carried along by the conveyor. When drawn into the suction box some of the beans meet the edges of the plates and are arrested thereby. Others, with more pointed ends, may enter the slots and be moved into the same until arrested by their taper. Then when the beans reach the cutter the protruding ends are sheared off and are carried away by the suction.

Referring now to the accompanying drawings,

Fig. 1 is a perspective view showing the suction box and limiting means inside of the same, with a portion of the traveling conveyor in front of the box.

Fig. 2 is a cross section on line 2—2 of Fig. 3, with the addition of a hood which may be used to enclose the conveyor in its travel past the suction box.

Fig. 3 is a front view of the suction box shown in Fig. 1.

Fig. 4 is a sectional plan view on line 4—4 of Fig. 3.

Fig. 5 and Fig. 6 are detail cross sections illustrating preferred forms of limiting means in which the slots flare rearwardly so that pieces of beans, leaves, bits of stem, and similar foreign objects will find easier passage through the slots.

As indicated in Figs. 1, 2 and 4 the beans are carried in the open buckets of the conveyor 10, past the front of the suction box 11. Devices for depositing the beans in the buckets and for driving the conveyor are well known in the art and hence need not be illustrated or described herein. Suffice it to say that any suitable and convenient means for the purpose may be employed. Likewise any suitable means may be used to create the suction through the suction box, in the direction of the arrows, Figs. 2 and 4, as for example an exhaust fan (not shown) connected to a draft pipe 12 attached to the rear of the suction box.

The limiting means shown comprises a plurality of thin narrow horizontal plates 12, arranged closely spaced one above the other, forming uniform narrow spaces or slots between, and mounted on screw rods 13 with intermediate spacers 14. This assembly is carried by a sliding frame 15 (inside of the suction box) which may be adjusted toward or from the conveyor. The frame is held in adjusted position by clamping screws 16 extending through slots 17 in the top of the suction box. The slots 17 are preferably wider than the screws so that one end or the other of the plate assembly may be shifted toward or from the conveyor, more or less independently of the other end, as may be necessary or desirable to set both ends at the same distance from the conveyor. The front edges of the plates, preferably square or only very slightly rounded if at all, are arranged in vertical alignment, as shown. The plates being thin they can be spaced close enough together to prevent the butt ends of the beans, or most of them, from entering the slots, thus insuring a minimum of waste, without materially impeding the flow of air at the velocity necessary to carry the beans into position to engage the knife.

The suction box front 18, which is removably mounted in end guides 19, has a horizontally elongated opening 20 exposing the plate assembly or limiting means, and its forward edge 21 is beveled to form the knife or cutter. The knife or cutter is downwardly and forwardly inclined so that when engaged by the beans the tendency will be for the latter to be cammed downwardly against the bottom of the conveyor bucket rather than upwardly, thus insuring a more positive shearing action. Behind the cutter the successively shorter plates 12 have their edges substantially parallel with the cutter, so that as the tips of the beans are sheared off they will find themselves in an open space, free from the plates and slots, thus affording unimpeded travel with the air current into the draft pipe or trunck 12. The plates being thin there is practically no tendency for the tapering ends of the beans to be wedged in the slots, especially if the edges of the plates are substantially unrounded and the spaces between the plates flare toward the rear, as in Fig. 5 or Fig. 6. With the edges of the plate square, bean tips fine enough to enter the slots encounter the scraping resistance of the relatively sharp edges and are thus arrested before they get far enough into the slots to become wedged therein, and since the wedging tendency is reduced to a minimum the frictional resistance of the plates to the travel of the beans along the slots is also minimized, with the net result that the beans are less disturbed in position but remain substantially parallel to each other as the conveyor carries them forward to the cutter.

By the use of narrow spacing between the plates the butt ends of the beans (that is, the ends by which they were attached to the plant) can not enter the slots and hence they simply slide smoothly along the edges of the plates, so that the portion cut off is only that part which extends from the plane of the knife 20 to the front edges of the plates. By adjustment of the plate assembly toward the knife the snipped portion can be made as short as desired, thus minimizing waste, which is a highly important matter in the canning industry. Of course the fine-pointed ends of some of the beans can enter the slots, but such ends usually have a steep taper and hence as a rule only a little of the tips can enter the slots before the beans are arrested by the edges of the slots.

The rearward flare illustrated in Figs. 5 and 6 also minimizes any tendency of bits of leaf, stems, and the like to be caught between the plates, but if the beans are wet, as is sometimes the case, such foreign particles are apt to stick to the plates and may eventually choke the slots, or some of them, to such an extent that at some points the draft will be insufficient to draw some of the beans into position for snipping. To correct this possibility a scraper 22 is provided, movable along the slots by means of a handle 23 extending out through an opening in the end of the suction box. The scraper may be in the form of a narrow plate provided at its vertical front and rear edges with fingers extending into the slots. By moving the scraper back and forth along the slots from time to time the attendant can clear the latter of adhering pieces and thus keep the slots open.

At one end of the suction box is an opening 24 provided with an adjustable closure in the form of a lid 25 pivoted at 26, to admit a regulated stream of air to carry the snipped ends of the beans, as they are sliced off by the knife, into the main current of air and thus prevent accumulation of the bean ends in a pocket where the suction is weak. Also, if the suction is too great the closure can be opened more or less, thus admitting air to the box at a point outside of the conveyor so that the current across the conveyor is correspondingly decreased in velocity. In this way the draft can be regulated to carry the beans into position for engagement with the knife without jamming them too firmly against the plates. This adjustment takes care of varying conditions of the beans, some lots being large and heavy, other lots small and light. In some cases, too, the beans may be wet and thus tend to stick together and to the conveyor buckets, thus requiring a stronger draft.

If desired the suction box may be provided with an open ended hood 27, through which the conveyor passes, to concentrate the draft more or less at the bottom of the buckets and thus give a more efficient utilization of the air current.

If it is desired to snip both ends of the beans in the same machine without removing the beans and passing them through the machine a second time, two suction boxes, equipped as herein described may be provided, one in advance of the other on opposite sides of the conveyor, as will be readily understood.

It is to be understoood that the invention is not limited to the specific construction herein illustrated but can be embodied in other forms without departure from its spirit as defined by the appended claims.

I claim—

1. In a bean-snipping machine, the combination with a traveling conveyor having open ended buckets for the beans, suction means for drawing the beans partially out of the buckets, and a cutter to cut off the protruding ends of the beans; of means for limiting the movement of the beans out of the conveyor, comprising a plurality of thin plates parallel with the direction of travel of the beans and arranged in spaced relation one above the other, providing at their outer edges superposed closely spaced slots.

2. A machine according to claim 1, in which the spaces between the plates flare rearwardly.

3. A machine according to claim 1, in combination with a carrier for the plates, adjustable toward and from the conveyor, and means for securing the same in adjusted position.

4. A suction box for bean-snipping machines, having means for limiting the movement of beans into the box, comprising a plurality of long metal plates arranged one above the other across the box at the front thereof, the plates being closely spaced to provide narrow slots preventing the blunt ends of beans from entering the slots and the plates being thin to permit a large volume of air to pass.

5. In a bean-snipping machine, a suction box according to claim 4, in which the plates taper rearwardly to give the spaces between them a flare and thereby facilitate the rearward passage of leaves and other foreign matters.

6. In a bean-snipping machine, a suction box according to claim 4, in which the plates are spaced farther apart at the rear than at the front.

7. In a bean-snipping machine, a suction box having an open side for movement of beans thereinto, a frame mounted inside the box and adjustable toward and from the open side, and means carried by the frame to arrest the beans entering the same, comprising a plurality of thin parallel elongated plates arranged one above the other and providing long narrow slots open to and parallel with said open side.

8. A suction box according to claim 4, in combination with scraping means cooperating with the plates and movable longitudinally thereof to remove adhering material therefrom.

9. A suction box according to claim 4, in combination with a manually operable scraper movable longitudinally of the plates to remove adhering material therefrom.

In testimony whereof I hereto affix my signature.

CHARLES M. HAYNES.